United States Patent
Osteen

[15] 3,661,685
[45] May 9, 1972

[54] LAMINATED ASSEMBLY OF POLYCARBONATE AND POLYACRYLATE RESIN SHEETS AND METHOD OF MAKING THE SAME

[72] Inventor: Mitchell M. Osteen, Zirconia, N.C.
[73] Assignee: General Electric Company
[22] Filed: Oct. 28, 1968
[21] Appl. No.: 771,107

[52] U.S. Cl. .................161/1, 156/306, 161/183, 161/252, 240/25
[51] Int. Cl. .....................H01k 5/00, B32b 27/30
[58] Field of Search ...........161/1, 6, 183, 247, 252; 156/306; 240/25

[56] References Cited

UNITED STATES PATENTS

| | | | |
|---|---|---|---|
| 3,549,476 | 12/1970 | Dietzel et al. | 161/183 X |
| 3,582,398 | 6/1971 | Ringler | 161/183 X |
| 2,774,697 | 12/1956 | Koblitz | 161/183 |
| 2,787,568 | 4/1957 | Koblitz | 161/183 |
| 3,309,220 | 3/1967 | Osteen | 117/33.3 |
| 3,320,116 | 5/1967 | Tocker | 161/252 |
| 3,348,035 | 10/1967 | Franklin et al. | 240/25 |
| 3,388,035 | 6/1968 | Mattimoe et al. | 161/183 |
| 3,420,679 | 1/1969 | Gifford et al. | 161/183 X |
| 3,435,202 | 3/1969 | Jablonski | 240/25 |
| 3,457,104 | 7/1969 | Bristol | 117/138.8 |
| 3,520,768 | 7/1970 | Peilstocker et al. | 161/183 X |

*Primary Examiner*—Harold Ansher
*Attorney*—Sidney Greenberg, J. Wesley Haubner, Frank L. Neuhauser, Oscar B. Waddell and Melvin M. Goldenberg

[57] ABSTRACT

Transparent globe for street lighting luminaires comprises a laminated assembly of superposed sheets of polycarbonate resin and polyacrylate resin having an ultraviolet absorbing compound incorporated preferably in the polyacrylate resin sheet.

11 Claims, 3 Drawing Figures

Inventor,
Mitchell M. Osteen,
by Sidney Greenberg
His Attorney.

LAMINATED ASSEMBLY OF POLYCARBONATE AND POLYACRYLATE RESIN SHEETS AND METHOD OF MAKING THE SAME

The present invention relates to composite plastic products and the method of making the same, and more particularly relates to such products which are suitable for use as light transmitting globes or refractors for street lighting luminaires or other lighting fixtures.

It is an object of the present invention to provide a composite light transmitting plastic product having good impact resistant properties and high operating temperature capabilities coupled with high resistance to degradation by ultraviolet light.

It is another object of the invention to provide a laminated product of the above type which is readily fabricated for use in a variety of applications, and which is especially suitable for light transmitting globes or refractors of luminaires and the like.

It is a particular object of the invention to provide a light transmitting globe of the above type for use in street lighting luminaires having a light source from which some ultraviolet radiation is emitted and which are installed in areas where the globes are subject to breakage due to vandalism or other hazardous conditions.

Other objects and advantages will become apparent from the following description and the appended claims.

With the above objects in view, the present invention in one of its aspects relates to a composite plastic material comprising a sheet of polycarbonate resin having superimposed thereon a sheet of polyacrylate resin in intimate adherence thereto, at least one of the resin sheets having an ultraviolet absorbing compound incorporated therein.

The invention will be better understood from the following description taken in conjunction with the accompanying drawing, in which.

Figure 1:
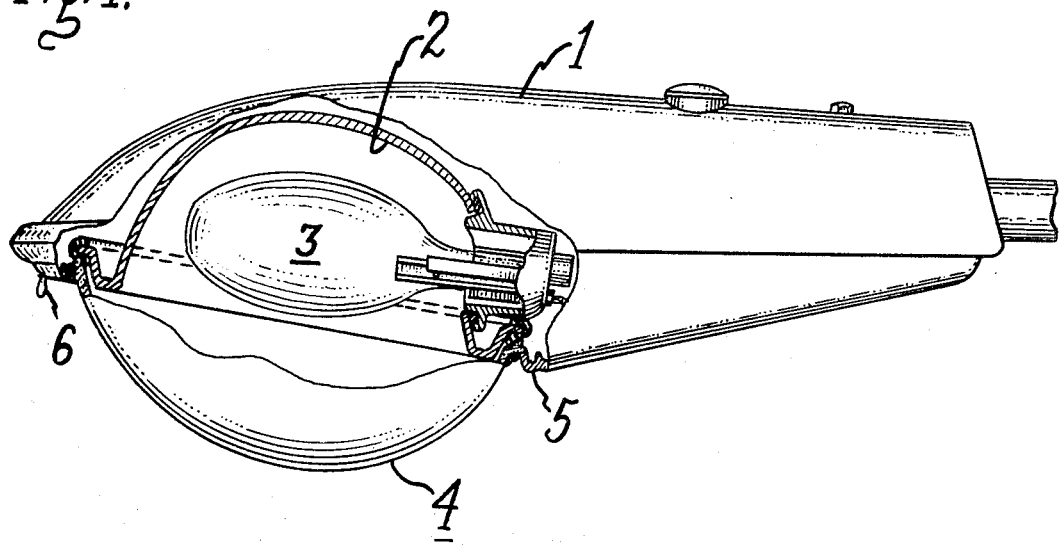
FIG. 1 is a view in elevation, partly broken away, of a street lighting luminaire having a transparent laminated refractor embodying the invention.

Referring now to the drawing, and particularly to FIG. 1, there is shown a street lighting luminaire comprising a housing 1 in which are mounted a reflector 2 and a lamp 3, and a light transmitting globe or refractor 4 mounted in a bottom door 5 for enclosing the reflector and lamp. Bottom door 5 is hingedly secured at its rear end to housing 1 and detachably secured at its front end thereto by latch 6.

Lamp 3 is typically a gaseous discharge lamp, such as a mercury or sodium vapor lamp, fluorescent lamp, or other light source which in operation emits appreciable amounts of ultraviolet radiation. While conventional refractors of glass usually employed for such luminaires are ordinarily not adversely affected by exposure to ultraviolet rays, organic polymeric (i.e., synthetic plastic) materials generally are degraded to some extent by such rays. Hence, although the use of plastic refractors is often desirable in order to obtain the advantages of lightness, economy and other favorable characteristics, various adverse effects have been encountered in such use. Their degradation resulting from exposure to ultraviolet radiation manifests itself in yellowing or other discoloration, embrittlement, and loss of other initially good physical properties. A particular resin material which is otherwise desirable for use in luminaire refractors is polycarbonate resin, in view of its good light transmitting properties coupled with exceptionally high impact strength and thermal resistance. However, this plastic material is likewise adversely affected by exposure to ultraviolet radiation.

Figure 2:
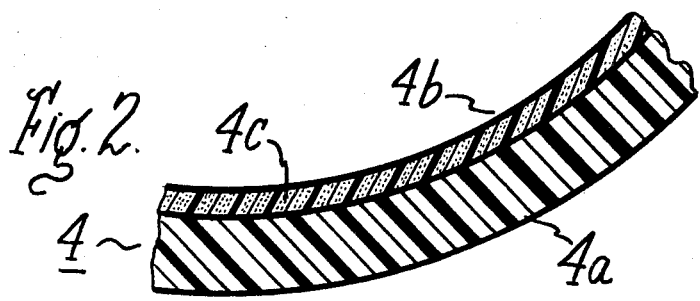
FIG. 2 is an enlarged cross-sectional view of a portion of the laminated refractor of the FIG. 1 device.

In accordance with the invention, this difficulty is overcome by providing a laminated assembly of a polycarbonate resin sheet and a polyacrylate resin sheet, wherein an ultraviolet light absorbing compound is incorporated in the polyacrylate resin sheet. Such a laminated assembly is shown in FIG. 2, wherein a portion of the refractor 4 of FIG. 1 is shown in cross-section, the assembly comprising an outer sheet 4a of polycarbonate resin having a thin polyacrylate resin sheet 4b intimately bonded thereto. Polyacrylate resin sheet 4b has dispersed therein a suitable ultraviolet absorbing compound 4c, as more fully disclosed below. As will be seen, the polyacrylate resin sheet 4b is arranged on the inside of the refractor so as to intercept the ultraviolet rays from lamp 3 before they can enter the polycarbonate resin sheet 4a.

The polycarbonate resins used in the practice of this invention are well known in the art and may be defined as high molecular weight aromatic carbonate polymers which may be prepared by reacting a dihydric phenol with a carbonate precursor such as phosgene, a haloformate or a carbonate ester. Such carbonate polymers are characterized by recurring structural units of the formula

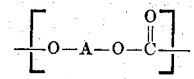

where A is a divalent aromatic radical of the dihydric phenol employed in the polymer producing reaction. Details of such carbonate polymers and the method of making them are found in U.S. Pat. No. 3,309,220 – Osteen, which is incorporated by reference herein.

The term "polyacrylate" as used herein is meant to embrace within its scope those polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylate" as it appears herein. The polymerization of the monomeric acrylates and methacrylates to provide the polyacrylate resins useful in the practice of the invention may be accomplished by any of the well-known polymerization techniques.

The polyacrylate resin sheet 4b has incorporated therein an ultraviolet light absorbing compound which may be any suitable one of the known compounds of this type. Such compounds are disclosed, for example, in the aforementioned Osteen patent, and includes substituted derivatives of benzophenone and of benzotriazole, among other compounds. The ultraviolet absorbing compound may be incorporated in the polyacrylate resin by addition of the absorber into the bulk material, referred to as bulk stabilization, or by applying the absorber as a coating on the surface of the polyacrylate resin sheet. While it is preferred to incorporate the ultraviolet absorbing compound in the polyacrylate resin sheet, the invention includes within its scope the use of the ultraviolet absorber in either or both of the polyacrylate resin or polycarbonate resin sheets. The ultraviolet light absorbing compound may be of types other than those mentioned above, as, for example, compounds or materials which are capable of transforming the ultraviolet light to light of other wavelengths or to other forms of energy which are innocuous or even beneficial to the properties of function of the plastic refractor. Such compounds and materials accordingly are intended to be included in the meaning of ultraviolet absorbing compound as used herein.

In work done in connection with the invention, a 15 mil thick sheet of polymethylmethacrylate containing an ultraviolet stabilizer was heat-pressure fused to a three-sixteen inches thick sheet of polycarbonate resin in a laboratory press, using a total pressure of 5,000 lbs. over an area of 6.25 sq. in. at a temperature of 155° C. The press heater was then turned off, and the entire mass cooled by compressed air to 100° C while the aforementioned pressure was maintained. The polycarbonate-polyacrylate laminate thus made was then removed from the press.

Two laminated units prepared by the above described procedure were cut in half and the resulting four samples were numbered respectively 1, 2, 3 and 4. Percent transmission curves in wavelengths from 350 to 650 mµ were recorded, and the initial yellowness factor for each sample was calculated by $$YF = \frac{T640 - T450}{T560} \times 100$$

where $T$ represents the percent transmission at the subscript wavelength in mµ of the sample, as compared to air. The initial yellowness factors were found as follows:

| Sample 1 | 14 |
| Sample 2 | 10 |
| Sample 3 | 12 |
| Sample 4 | 12 |

The four samples were then exposed to the ultraviolet radiation emanating from a General Electric H400E1 mercury lamp in an exposure chamber at an ambient temperature of about 60° C, for 360 hours. Samples 1 and 3 were exposed with the polyacrylate resin sheet facing the lamp, while samples 2 and 4 were exposed with the polycarbonate resin sheet exposed to the lamp. The yellowness factors exhibited by the samples after such exposure were as follows:

| Sample 1 | 11 |
| Sample 2 | 31 |
| Sample 3 | 10 |
| Sample 4 | 31 |

It is evident from these results that the laminated products arranged with the polyacrylate resin sheet facing the ultraviolet radiation source exhibited much greater resistance to discoloration than those not so arranged.

A laminated polycarbonate-polyacrylate product of the described type may be produced by a variety of methods. Sheet stock for subsequent vacuum forming could be produced by employing two extruders and pressing the extruded sheets of the respective resins together while still hot. Injection molding processes may also be found useful in providing such a laminated composite sheet of desired configuration.

Figure 3:
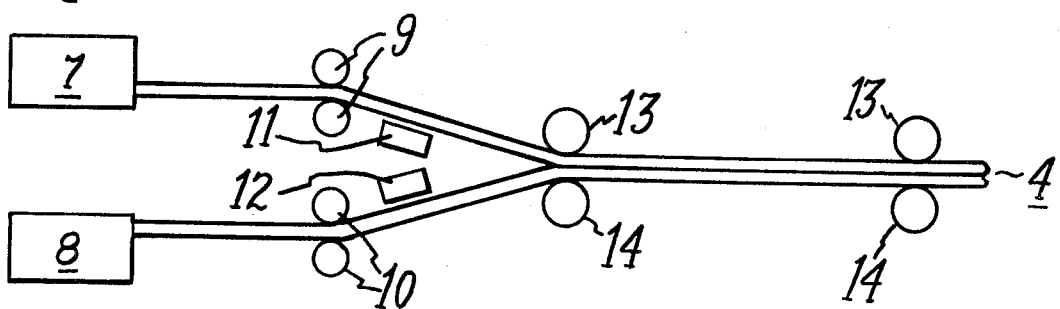
FIG. 3 is a diagrammatic showing of a method for making the laminated sheet of the invention.

An example of an extruding process is illustrated in FIG. 3, wherein extruder 7 produces a sheet of polycarbonate resin and extruder 8 produces a sheet of polyacrylate resin. Typically, rollers 9 are at a temperature of about 150° C., while rollers 10 are about 100° C. Heaters 11 and 12 respectively span the width of the extruded sheets and as shown are arranged near the point of contact of the converging sheets, and are placed adjacent the facing surfaces of the plastic sheets so as to heat these surfaces for fusing the same. Heater 11 heats the inner surface of the polycarbonate sheet to a temperature of about 150° to 300° C., while heater 12 heats the polyacrylate sheet surface to a temperature of about 100° to 200° C. Rollers 13 and 14 press the thus heated plastic sheets together with sufficient pressure, e.g., in the range of about 500–5,000 psi to form a tightly adherent, laminated composite sheet.

With such a sheet used for a luminaire refractor as shown and described in connection with FIGS. 1 and 2, the outer layer of polycarbonate resin provides high impact strength and thermal stability for firm support and protection of the polyacrylate resin film, while the latter film with UV absorber therein will intercept the ultraviolet radiation from the lamp to protect the polycarbonate layer from the deleterious effects of such radiation.

While a typical laminated assembly is composed of a sheet of polyacrylate resin and a sheet of polycarbonate resin, the invention includes within its scope a lamination comprising polyacrylate resin sheets with UV absorber therein on opposite sides of the polycarbonate resin sheet, whereby the latter sheet is protected on both sides from ultraviolet rays, which may, for example, emanate from a lamp on one side of the lamination and from the sun on the other side.

It will also be understood that the laminated product of the invention will find a variety of applications in addition to that of street lighting, as for example for window glazing, auto tail lights, and other uses where exposure to ultraviolet light, elevated temperature, and risk of breakage may be a problem.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A composite material comprising a laminated assembly of superposed sheets respectively consisting essentially of aromatic polycarbonate resin and polyacrylate resin.

2. A material as defined in claim 1, wherein one of said sheets has incorporated therein an ultraviolet radiation absorbing compound.

3. A material as defined in claim 1, wherein said polyacrylate resin sheet has an ultraviolet radiation absorbing compound incorporated therein.

4. A material as defined in claim 3, and a light source which emits ultraviolet radiation arranged adjacent said material.

5. A device as defined in claim 4, wherein said laminated assembly is arranged with the polyacrylate resin sheet facing said light source.

6. A device as defined in claim 5, wherein said light source is mounted in a luminaire and said laminated assembly is in the form of a light transmitting globe covering said light source.

7. A device as defined in claim 1, wherein the polycarbonate resin sheet is sandwiched between polyacrylate resin sheets.

8. A device as defined in claim 7, wherein the polyacrylate resin sheets contain an ultraviolet absorbing compound.

9. A method of making a laminated composite plastic sheet which comprises forming separate sheets of an aromatic polycarbonate resin and a polyacrylate resin, and joining said sheets together in superposed relation.

10. The method as defined in claim 9, wherein an ultraviolet absorbing compound is incorporated in the polyacrylate resin sheet.

11. The method as defined in claim 9, wherein said sheets are fused together by application of heat and pressure.

* * * * *